Figure 1:
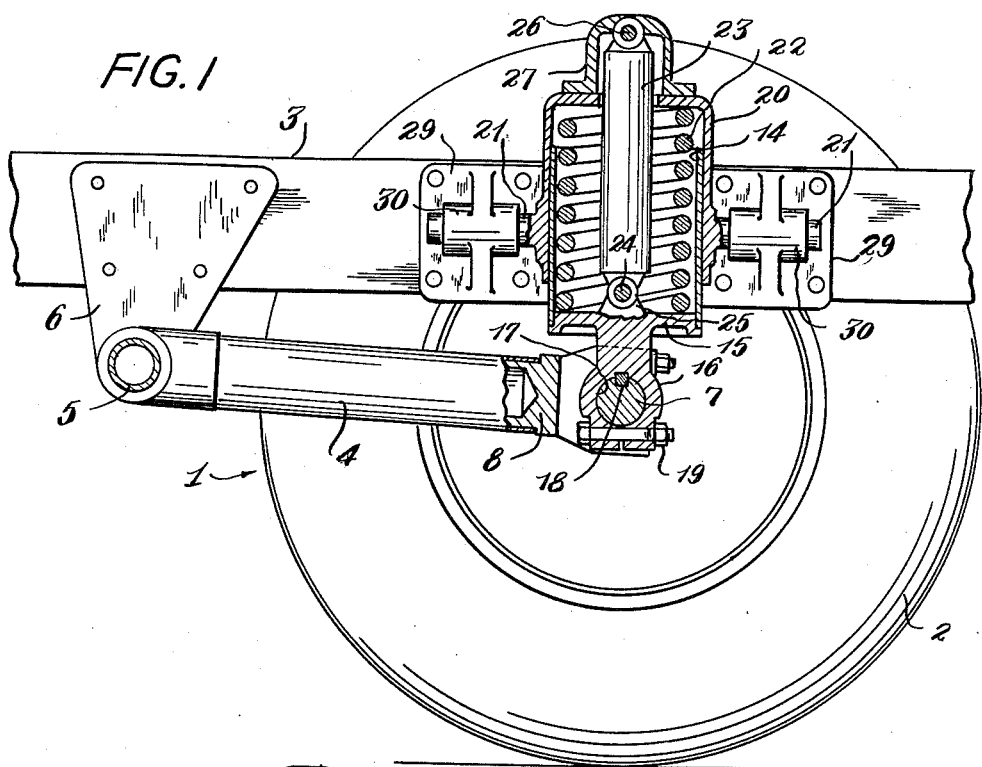

Feb. 18, 1958     C. S. GOBY     2,823,927
TORQUE ARM TYPE OF A WHEEL SUSPENSION
Filed Jan. 7, 1954

INVENTOR.
CLIFFORD S. GOBY
BY
*Oldham & Oldham*
ATTORNEYS

United States Patent Office 2,823,927
Patented Feb. 18, 1958

2,823,927

TORQUE ARM TYPE OF A WHEEL SUSPENSION

Clifford S. Goby, Cleveland, Ohio, assignor of twenty-five percent to Frieda K. Schumacher, Cleveland, Ohio Application January 7, 1954, Serial No. 402,751

3 Claims. (Cl. 280—124)

This invention relates to a wheel suspension, and especially to wheel suspensions which may be used to position either the front wheel in a vehicle, or which may be used to position a rear wheel in a vehicle, and not interfere with the ordinary steering function of the front wheels, or the drive functions of the rear wheel.

Many different types of wheel suspension have been proposed heretofore for vehicles and one type of a front wheel suspension which has gone into wide commercial use and acceptance today is the so-called "knee-action" type of a wheel suspension. Such a suspension includes a plurality of positioning arms in pivotal relationship with each other and with a coiled spring usually being used to provide the spring means intermediate the running gear of the vehicle and the frame of the vehicle. In the use of this type of wheel suspension, it has been a continual problem to the auto owner to maintain his wheel suspension in proper operative condition. Thus, the caster, or camber of the wheel is easily knocked out of adjustment by bumps and shocks to which the wheel suspension system is subjected, when in use. The wheel suspension has been relatively weak and easy to jar or bump out of adjustment because of the number and types of members required for positioning the wheel in the "knee-action" type of a suspension. Of course, when a wheel does not have the proper caster and camber and is not positioned in a completely accurate or proper manner, the tires upon the wheel positioned in such improper manner wear very rapidly and unevenly so that a very objectionable operative action results. Furthermore, it is a somewhat tedious, painstaking operation to adjust the position of wheels on automobiles as made today, especially the front wheels of automobiles, so that the average auto owner does not continually maintain his front wheels in proper positions. Consequently excessive uneven wear occurs in the front tires which are thrown out of balance by the uneven tire wear and this further aggravates the problem of properly positioning such wheels.

The general object of the present invention is to provide a new and improved type of suspension for vehicles wherein the suspension is characterized by the rigidity, or sturdy nature of the connection between the wheel positioning means and the frame.

Another object of the invention is to provide a wheel suspension which includes one arm or tube as the primary wheel positioning member in the suspension and which member is limited to pivotal or arcuate movement in a vertical plane normal to the horizontal plane defined by the frame of the vehicle.

Another object of the invention is to provide an improved wheel suspension wherein a minimum number of parts are used to position the wheels on the vehicle in desired spring relationship thereto.

A further object of the invention is to provide, in a wheel suspension, means for engaging the wheel to the frame with a portion of such means being movable longitudinally of the frame as wheel deflection occurs with relation to the frame.

Yet a further object of the invention is to provide a wheel suspension which is equally adaptable in principle to both the front and the rear wheels of a vehicle. Other and more specific objects of the invention are to position a leaf spring in slidable engagement with a vehicle frame so that the ends of the leaf spring can move longitudinally with relation to the frame in opposite directions as the leaf spring is flexed with relation to the frame; to secure the king pin and steering knuckle fixedly to a spring for movement therewith but for permitting relative pivotal movement between a stub shaft associated with the king pin and steering knuckle and the main wheel positioning member used in the suspension; to position a coil spring unit on a vehicle frame so that such a coil spring can move longitudinally of the frame as wheel deflection occurs; to connect a driven axle for a rear wheel to a drive axle by universal joint means; and to use a torque arm trunnion that extends transversely of the vehicle frame to position torque tubes on opposite sides of the frame for individual wheel suspension thereby.

The foregoing and other objects and advantages of the invention will be made more apparent as the specification proceeds.

Figure 2:
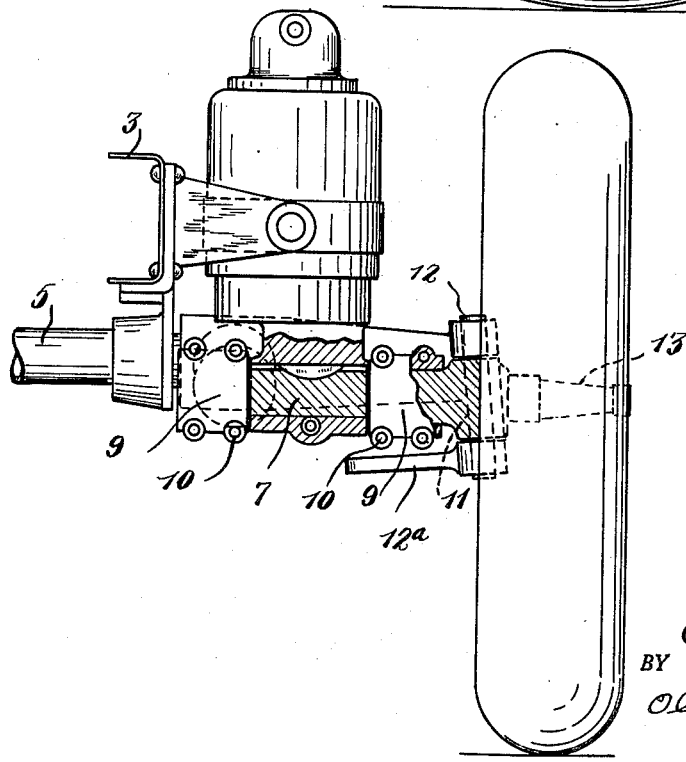

For a better understanding of the invention, reference should be had to the accompanying drawings wherein several currently preferred embodiments of the principles of the invention are shown and wherein:

Fig. 1 is an elevation, partially broken away and shown in vertical section, of the wheel suspension of the invention for a front wheel of a vehicle; and Fig. 2 is a front elevation of the wheel suspension of Fig. 1, also partially broken away and shown in vertical section.

In the accompanying drawings and the following specification, corresponding numerals will be used to refer to corresponding parts so that comparison between the drawings and specification is facilitated.

The present invention relates to a wheel suspension wherein a frame is provided, a torque arm is pivotally secured at one end to the frame, a stub axle shaft is present in the suspension, and means journal the stub axle in the torque arm at the free end thereof. A wheel is operatively carried by the stub axle shaft, and resilient suspension means are fixedly secured to the stub axle shaft at one portion of such suspension means, and other portions of such suspension means are operatively secured to the vehicle frame for movement longitudinally of the frame as spring movement occurs in the supported wheel.

In order to understand the present invention completely and clearly, attention now is directed to the details of the structure shown in the drawings, and where a wheel suspension, indicated as a whole by the numeral 1, is shown. This wheel suspension 1 is shown in combination with a front wheel 2 of a vehicle having a longitudinally extending frame 3. An important portion of the wheel suspension 1 resides in a torque tube, or positioning arm 4 which is secured in the suspension by means of a trunnion shaft 5 extending transversely of the frame 3 and positioned on the frame by means of brackets 6 secured on each side of the frame 3. The torque tube 4 is thus positioned firmly in the vehicle and wheel suspension so that such tube may only have pivotal movement about the trunnion shaft 5 in a plane normal thereto. A stub shaft 7 is journaled on the free end of the torque tube 4 by means of a bifurcated connector block 8 in which spaced end portions of the stub shaft are journaled by means of bearing caps or housings 9. The bearing caps 9 are secured to the connector block 8 by cap screws, or bolts 10, or similar means. A bore or hole 11 is provided in the laterally outer end of the stub axle shaft 7 for positioning a king pin 12 in the wheel suspension 1 and such kingpin 12 has conventional steering knuckle means 12a and wheel support spindle 13 secured thereto or formed therewith. Thus, the front wheel 2 is journaled on the wheel support spindle 13 and can be steered by conventional steering means engaging with the steering knuckle 12a provided on the apparatus.

An important feature of the invention is that resilient suspension means are fixedly engaged between the stub shaft 7 and the frame 3 to prevent any rotation of such shaft 7 and permit movement of such shaft only in a direction substantially normal to the longitudinal axis of the frame on an arc about the center line of the trunnion shaft 5. The resilient support used in this embodiment of the invention is shown as comprising a sleeve 14 which has an end cap 15 fixedly secured to the lower end of such sleeve 14. The end cap 15 has a protruding lug 16 thereon in which a bore 17 is provided that receives the stub axle shaft 7. A suitable key or similar member 18 is positioned in the bore 17 to lock the stub axle shaft 7 to the lug 16 and prevent any relative arcuate movement therebetween. Assembly of the lug 16 and stub shaft 7 may be facilitated by splitting the lower end of such lug 16 and by having a bolt 19 extend through the split portion of such lug to draw it tightly into engagement with the stub shaft after such shaft has been threaded through the associated bearing and housing means used in conjunction with the lug 16 to position the stub shaft. The upper end of the sleeve 14 is closed by an upper end cap 20 telescopically receiving the sleeve. Trunnions 21 are provided on opposed surfaces of the end cap 20 in alignment with each other and in general alignment with the longitudinal axis of the frame 3. A coil spring 22 is received within the enclosure formed by the sleeve 14 and its associated end caps and such a coiled spring normally is in compression for carrying the load placed upon the front wheel 2.

In order to reduce vibration and movement of the front wheel 2 by variations in the support surface, a conventional double-acting hydraulic shock absorber 23 is positioned on the axis of the coil spring 22 by means such as a pin 24 that engages a clevis 25 formed on the inner surface of the end cap 15. The upper end of the shock absorber 23 is suitably secured in place by a pin 26 engaged with the upper end of the shock absorber 22 and in turn engaging an extension 27 secured to the upper end cap 20.

As an important feature of the invention by which longitudinal movement is permitted between the wheel support means and the frame 3, a pair of trunnion brackets 29 are secured to the frame 3 at longitudinally spaced portions thereof. These brackets 29 are bolted or riveted to the frame 3 and provide longitudinally extending sleeves or bosses 30 in which the trunnions 21 are positioned for limited movement longitudinally of the frame 3. Thus as the torque tube 4 moves in an arc about its fixed support, the front wheel 2 and associated support means all move in an arc about the pivot axis of such torque tube. The limited longitudinal movement of the front wheel that occurs is absorbed by the trunnions 21 and their associated support means so that a sturdily positioned, simplified wheel suspension is provided by the invention and such suspension is adapted to take ordinary road shocks and bumps with no deflection or deviation in the wheel support means being easily made or occasioned by use of the wheel suspension.

In view of the foregoing it is seen that the objects of the invention have been achieved in that a sturdy pivotal type of support member or torque tube has been provided for positioning a wheel on a vehicle frame. This support arm can be securely positioned on the frame and be resistant to any deflection such as tends to knock the wheels out of proper alignment with the frame.

While several complete embodiments of the invention have been disclosed herein, it will be appreciated that modification of these particular embodiments of the invention may be resorted to without departing from the scope of the invention as defined in the appended claims.

What is claimed is:

1. A wheel suspension comprising a frame, a torque arm, means pivotally securing said torque arm at one end thereof to said frame, a stub axle shaft, means journalling said stub axle shaft on said torque arm at a free end thereof, means for operatively supporting a wheel on said stub axle shaft to provide a wheel unit therewith, coil spring means having a housing therearound fixedly secured at one portion thereof to said wheel unit and forming a second unit with said stub axle shaft, and bracket means operatively secured to said frame and slidably engaging said spring means to permit movement of said spring means longitudinally of said frame with arcuate movement of said torque arm about said first-named means.

2. A wheel suspension comprising a frame, a torque arm, means pivotally securing said torque arm at one end thereof to said frame, a stub axle shaft, means journalling said stub axle shaft on said torque arm at a free end thereof, means for operatively supporting a wheel on said stub axle shaft, a double acting shock absorber including a coil spring with a housing therearound fixedly secured at one end to said stub axle shaft to provide a non-rotatable unit therewith, and bracket means secured to said frame and slidably engaging said shock absorber to permit movement of said shock absorber along said frame with arcuate movement of said torque arm about said first named means.

3. A wheel suspension comprising a frame, a torque arm, means pivotally securing said torque arm at one end thereof to said frame, a stub axle shaft, means journalling said stub axle shaft on said torque arm at a free end thereof, means for supporting a wheel in association with said stub axle shaft; a double acting shock absorber fixedly secured at one end to said stub axle shaft; cap means forming part of said shock absorber, trunnions operatively carried by said cap means, and a pair of trunnion bearings secured to spaced portions of said frame, said trunnions being slidably positioned in said trunnion bearings to provide movement of said shock absorber and axle shaft along the axis of said frame, said shock absorber being secured to said cap means.

References Cited in the file of this patent

UNITED STATES PATENTS

| | | |
|---|---|---|
| 1,608,086 | Douglas | Nov. 23, 1926 |
| 2,085,662 | Johnson | June 29, 1937 |
| 2,117,401 | Cobb | May 17, 1938 |
| 2,258,449 | Grabach | Oct. 7, 1941 |